Sept. 10, 1968     F. A. HOUGHTON     3,400,792
RESILIENT-CANTILEVER MOUNTING OF IMPACT RECEIVING MEMBERS
UTILIZING FLEXIBLE SUSPENSION
Filed April 21, 1967                          2 Sheets-Sheet 1

INVENTOR.
FRANK A. HOUGHTON
BY
*Russell C. Wells*
ATTORNEY.

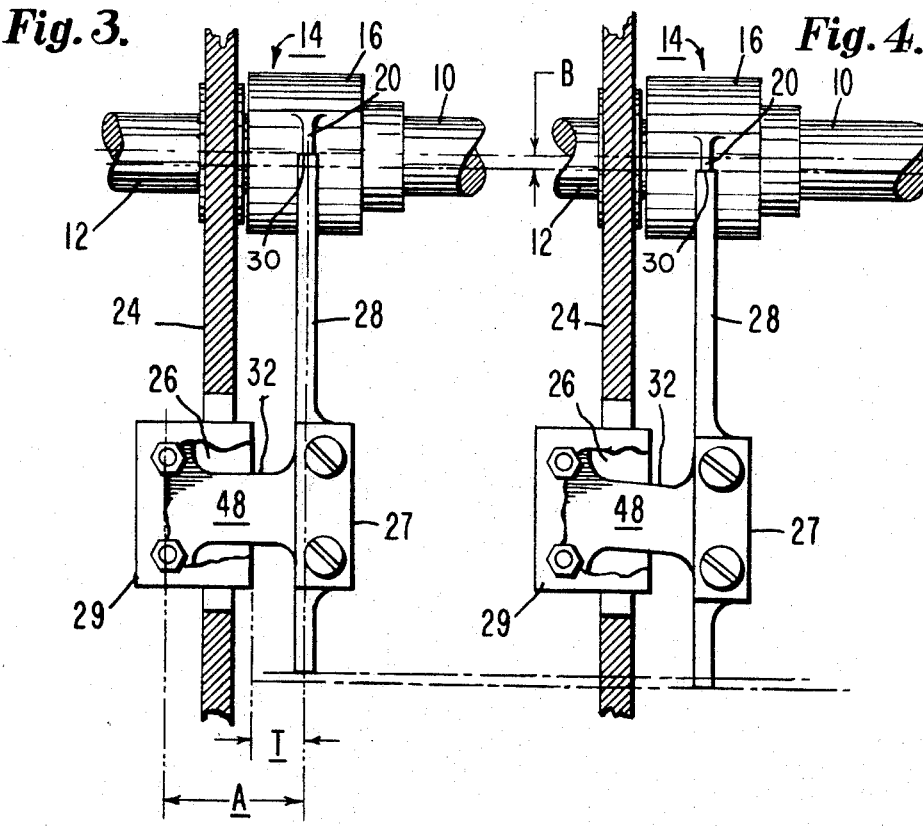

United States Patent Office 3,400,792
Patented Sept. 10, 1968

3,400,792
RESILIENT-CANTILEVER MOUNTING OF IMPACT RECEIVING MEMBERS UTILIZING FLEXIBLE SUSPENSION
Frank A. Houghton, Detroit, Mich., assignor to Burroughs Corporation, Detroit, Mich., a corporation of Michigan
Filed Apr. 21, 1967, Ser. No. 632,763
4 Claims. (Cl. 192—22)

ABSTRACT OF THE DISCLOSURE

A resilient beam mounting allowing operation of an impact receiving member in different senses of motion. One sense of motion is the deflection of a long cantilever under impact loads applied at the free end. Another sense of motion is the twisting of a short operating beam to rotate the impact receiving member into and out of the path of the impact device. A simple, reliable and accurate mounting provides each of the aforementioned unique beam lengths from a single cantilever spring.

Background of invention—Field of invention

This invention relates to a resilient mounting of a member which is subjected to high impact loads and to torsional twisting loads. The mounting permits both linear and rotational movement of the mounted member. More particularly, the invention disclosed herein relates to means for mounting clutch trip arms associated with spring clutches.

Prior art

Prior art devices for mounting clutch trip arms have included the use of bearings which permit the arm to be rotated away from the clutch, thereby engaging the clutch. A form of biasing, such as a tension or compression spring, is attached to the trip arm to return it into operative contact with the clutch for disengagement.

Due to the relatively high impact loads delivered to the trip arm by the clutch during disengagement, the forces transmitted to the bearing supports would tend to cause the bearings to become excessively worn, impairing the rotational freedom provided thereby. In order to overcome this failure, the bearings were overdesigned to accept these radial loads. However, such bearing mountings are still vulnerable to sliding, fretting and corrosive wear failure, especially where they are subjected to small oscillating motions.

A fixed stop is associated with the biasing means to locate the clutch trip arm in the proper position for disengagement. Often the stop would be the clutch housing itself, and the clutch trip arm would then be in frictional contact with the housing causing a reduction in the strength of the clutch trip arm structure.

In high speed applications or applications involving frictional rotation clutches, the response time involved in moving the clutch trip arm in and out of engagement is one of the limiting factors in the responsiveness or operational speed of the clutch mechanism. These response times are directly affected by the mass of the clutch trip arm mounting apparatus.

Summary of invention

A shock absorbing resilient cantilever supporting an impact receiving member such as the type used in mechanical spring clutches. The mounting defines a first unique cantilever length for a controlled deflection to absorb impact forces applied in the direction of the longitudinal axis of the impact receiving member. The same mounting further provides a second unique cantilever length for torsional loads which are applied to the beam through the impact receiving member. The cantilever's resiliency also provides the means for restoring the impact receiving member after removal of either the impact load or the torsional load. The mounting, because of its simplicity in the number and character of parts, reduces the operational response time to a value which is not a limiting factor in the application of the clutching mechanism.

Description of the drawings

The invention, both as to its organization and method of operation will best be understood by reference to the following detailed description taken in connection with the accompanying drawings, in which:

FIGURE 3 is a plan view of the resilient mounting structure of the invention at the instant of receiving an impact in a bending direction;

FIGURE 4 is a plan view of the resilient mounting structure of the invention at the instant of greatest bending deflection; and FIGURE 5 is a top view of FIGURE 3 with parts broken away.

Detailed description

Figure 1:
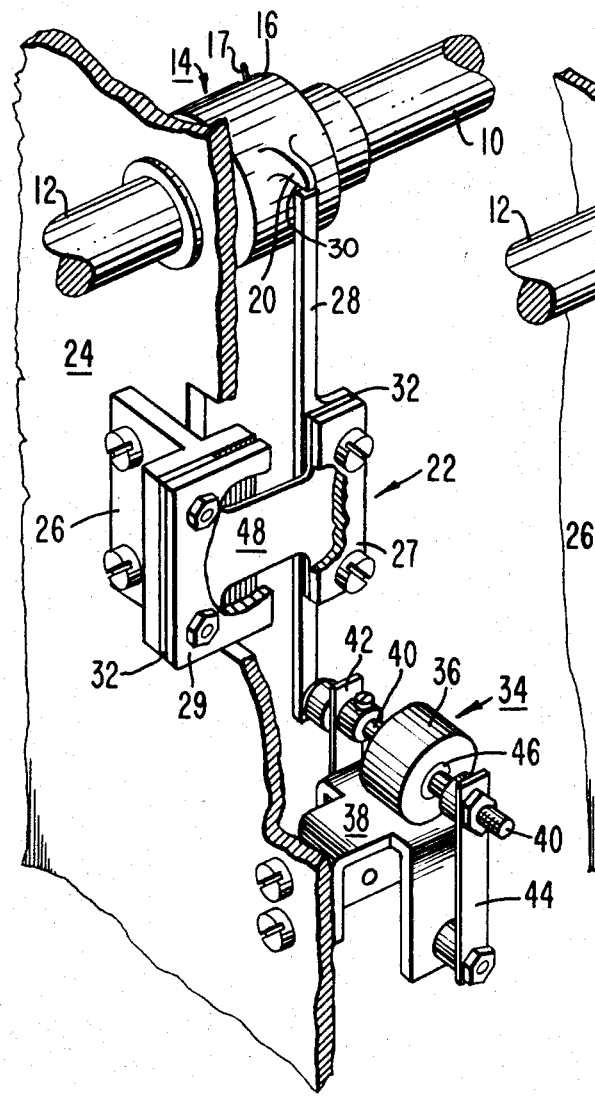
FIGURE 1 is a perspective view with parts broken away of the resilient mounting structure of the invention.

Referring to the figures and characters of reference and in particular to FIGURE 1, there is shown a rotating power input or driving shaft 10 which is connected to an output or driven shaft 12 by the use of a mechanical clutch 14. The clutch may be a conventional wrap-around helical coil spring clutch having an engagement control sleeve 16 surrounding the input or driveshaft 10. The engagement control sleeve 16 is shown here with only one sawtooth-shaped projection 20 on its periphery, although there could be a plurality of such teeth depending on the degree of rotation of the driven shaft for each clutch engagement. The engagement control sleeve 16 is attached to one end of a coil spring 17 which encircles the input drive member 18 and the output driven member 19 to which the other end of the spring is fastened, the sleeve 16 keeping the spring 17 expanded about the input and output member 18 and 19 in the disengaged condition of the clutch.

The clutch operation unit 22 comprises an elongated clutch trip arm 28, a shock absorber or a resilient cantilever flexure 32, mounting brackets 26 and 29 and a stiffening plate 27. One mounting bracket 26 is a T-shaped member which is attached to the machine sideframe 24. The cross-arm of the "T" which is normal to the machine sideframe 24 is the mounting surface for the flexure 32. Containing the flexure 32 on the mounting bracket 26 is a keeper plate 29. Extending transversely from and attached to the free end of the flexure 32 is an elongated rigid member or clutch trip arm 28. The clutch trip arm 28 is positioned in such a manner as to have the radial edge 30 of the sawtooth projection 20 bear against one end of the clutch trip arm 28, allowing transfer of the engagement and disengagement forces along the longitudinal axis of the clutch trip arm 28 and substantially normal to the cross-sectional area of the clutch trip arm 28.

The flexure 32 is a flat strip of resilient material which extends in the direction of its longitudinal extent from its mounting on the mounting brackets 26 and 27 to the clutch trip arm 28. The clutch trip arm 28 is mounted on one broadside of said flexure 32 with a stiffener plate 27 on the opposite broadside. The flexure 32 exhibits its greatest stiffness or resistance to bending in a direction parallel to its broadside.

Also mounted on the machine sideframe 24 and positioned adjacent to the clutch trip arm 28 is an actuator or solenoid control 34 for moving the clutch trip arm 28 out of mesh with the clutch engagement control sleeve 16. In the preferred embodiment, the solenoid 36 is positioned so as to strike the clutch trip arm 28 between the flexure 32 and the end of the trip arm opposite the clutch engagement control sleeve 16.

The body of the solenoid 36 is mounted on the machine sideframe 24 by means of a suitable bracket 38. However, the armature 40 of the solenoid 36 is mounted free of the solenoid body and supported on each side of the solenoid body by a pair of parallel spaced apart resilient arms 42 and 44 or flexures which are attached to the mounting bracket 38. The flexures 42 and 44 position the armature 40 in such a manner relative to the solenoid body that at all times there is a clearance between the armature 40 and the open cylindrical core 46 of the solenoid 36.

Figure 2:
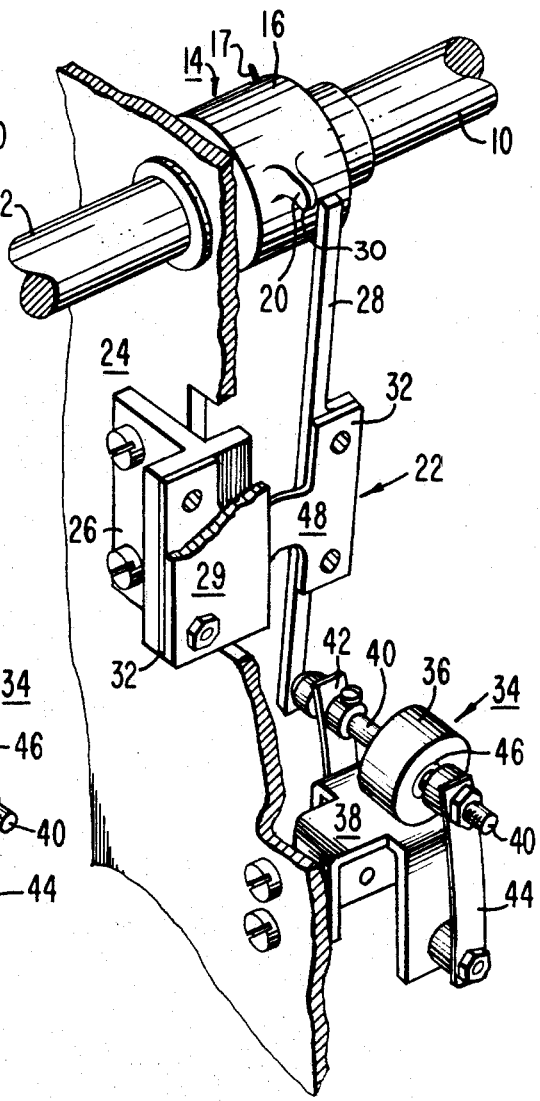
FIGURE 2 is a perspective view with parts broken away showing a torsional moment applied to the resilient mounting structure of the invention.

Due to this clearance, the armature 40 does not come into sliding contact with the core 46; hence, there is no wearing of these two elements since there is no frictional rubbing action between these parts. These flexures 42 and 44 pivot about the end which is secured to the mounting bracket 38, as shown in FIGURE 2, and such pivoting or arcuate movement is effected by controlling the magnetic forces of the solenoid 36.

As hereinbefore noted, these two flexures 42 and 44 supporting the armature 40 of the solenoid 36 are mounted as cantilevers to the mounting bracket 38 and are fixedly mounted to the armature 40 itself. When the solenoid 36 is energized from a control system and power supply, not shown, the armature 40 is moved relative to the solenoid body and strikes the clutch trip arm as shown in FIGURE 2. These flexures 42 and 44 are deflected from their normal position, thereby biasing the armature 40 in a direction opposite to the direction the solenoid 36 is driving the armature 40. The energy which these flexures 42 and 44 store in their deflected position is less than the magnetic force of solenoid driving the armature and because of this stored energy, the armature 40 will be returned to its normal position as shown in FIGURE 1, when the solenoid 36 is de-energized. In the above situation, it will be noted that each of these flexures 42 and 44 is deflected in a direction which is normal to their broadside which is the surface that encompasses the largest areas. This direction, normal to the broadside, coincides with the direction of minimum stiffness or resistance to bending of the flexure.

In distinction to the aforementioned deflection of the two flexure members supporting the solenoid armature, the flexure 32 which supports the clutch trip arm 28 is so positioned and so mounted as to provide deflection in a direction parallel to its broadside surface 48. This direction coincides with the direction of greatest stiffness or resistance to bending of the flexure 32 providing a high bending spring rate. Also this same flexure 32 is mounted in such a manner so as to allow a torsional twist as illustrated in FIGURE 2 to be applied to it without the attendant "roll-over" which is typical of such members.

The flexure 32 is sandwiched or confined between a pair of rigid parallel, flat plates 26 and 29 which extend from the machine sideframe 24 at the first end of the plates to a point which is intermediate the ends of flexure 32. The parallel plates 26 and 29 constrain the portion of the flexure 32 confined therebetween against rotational movement. In this way, a single resilient member can be used to satisfy the conflicting requirements of a deflecting cantilever in a first direction and that of a twisting beam without roll-over in a second direction orthogonal to the first direction.

In FIGURES 3 and 4, the flexure 32 is subjected to a high impact load applied through the longitudinal axis of the clutch trip arm 28. In this configuration, the flexure 32 is a cantilever having the load concentrated at the free end, and the beam is free to slideably move between the parallel plates 26 and 29 under the impact load from the disengagement of the clutch. The length of the beam, shown as "A," must be such that the shear forces due to the load do not exceed the critical shear which defines the minimum length and the allowable clutch override due to the deflection, shown as "B," of the beam from the applied load which defines the maximum length.

In the prior art, the clutch trip arm is mounted in an essentially rigid manner on an unyielding bearing support. When the high impact load caused by the clutch disengagement is applied to the clutch trip arm, this force is transmitted to the supports. If the supports are bearings, then the force applied to the clutch trip arm is transmitted to the bearing, causing excessive bearing wear. If the support is fixed, then the forces are applied to the supports themselves causing noise and vibrations, which affect other mechanisms in the machine. The use of the resilient cantilever mounting shown in the preferred embodiment acts as a shock absorber by dissipating the impact energy from the clutch trip arm through a predetermined beam deflection.

In FIGURE 2, the flexure 32 is subjected to a force applied to the clutch trip arm 28 so as to rotate the arm away from the clutch plate 16. In this situation, the degree of rotation desired is very small and on the order of a couple of degrees. The flexure 32 must twist so as to accomplish the rotational movement of the clutch trip arm, but the flexure 32 must not roll over. Roll-over is the characteristic of a beam wherein, during twisting, the upper and lower edge surfaces of the beam curl in an arcuate manner in the direction of rotation of the beam. When curling happens, the resiliency of the beam in the rotational sense fails, and the beam does not restore to a state of zero twist in a predictable manner.

In the torsional mode of operation, the length of the beam to be twisted shown as "T" in FIGURES 3 and 5, determines the amount of torque required to twist the beam through a given number of degrees of rotation. If the length is too great, curling will result, and if the length is too small, the amount of torque required will be excessive.

In the prior art, this clutch trip arm rotation was accomplished by pivotally mounting the clutch trip arm on a supporting member and providing a separate biasing means to return the clutch trip arm from its rotated position back to its "home position. Generally a limit to the return to the "home" position to prevent overthrow was also provided. This limit was not all too frequently the clutch itself, whereby the clutch trip arm constantly rode on the surface of the clutch causing wear to both members. With the resilient beam as shown in the present invention, the clutch mounting can be so positioned so that the "home" position is clear of the clutch itself, shown as "C," in FIGURE 5. The resiliency of beam eliminates the need for a separate external biasing to "home" the clutch trip arm. Hence, the resilient mounting provides not only a saving in the number of parts for a given clutch trip arm mechanism, but also a saving in wear on the necessary parts comprising the mechanism.

With the use of the pair of back-up cantilever mounted parallel plates 26 and 29 sandwiching a cantilever monuted flexure 32 supporting a clutch trip arm 28, the proper beam length "A" for a predetermined beam deflection "B" due to a load applied at the free end and the proper length "T" of the beam for predetermined amount of twist from a known torsional moment can be achieved. The resiliency of the flexure 32 also allows accurate positioning of the clutch trip arm for proper clutch engagement without causing excessive wear on the mechanisms. The use of a rectangular cross-sectioned flexure mounted as herein described provides the minimum torsional spring rate for a high bending spring rate.

It will be apparent that many changes and modifications of the several features described herein may be made without departing from the spirit and scope of the invention. It is, therefore, apparent that the foregoing description is by way of illustration of the invention rather than limitations of the invention.

I claim:

1. A clutch trip arm apparatus for controlling the engagement and disengagement of a spring clutch said apparatus comprising:

supporting means, a flat resilient shock absorber having a rectangular cross-section mounted as a cantilever to said supporting means, an elongated rigid member mounted on one broadside of said shock absorber and extending transversely thereto at the free end of said shock absorber, one end of said member in operative contact with said clutch in a direction along the longitudinal axis of said elongated member, a pair of rigid plates mounted on said support and extending along each broadside of said shock absorber to a point intermediate the elongated member and the support, said plates fixedly attached to said shock absorber at the support thereby allowing said shock absorber to bend in a direction parallel to the longitudinal axis of said member for absorbing the disengagement forces applied to said elongated member by said clutch, and actuator means disposed adjacent to the other end of said elongated member and applying a force to said member in a direction orthogonal to and disposed from the broadside of said shock absorber, whereby said force causes a twist of said shock absorber about the end of said plates adjacent the elongated member thereby rotating said elongated member away from said clutch to effect clutch engagement.

2. An energy absorbing support mounted on a frame for supporting an impact receiving member such as a clutch trip arm which disengages a spring clutch coupling high speed shafts, said support comprising:

a resilient strip flexure having a rectangular cross-section oriented with its broadsides in planes which are parallel to the direction of the impact, said strip supporting along one of its broadsides and at one end thereof the impact receiving member, a pair of mounting brackets for mounting said flexure as a cantilever with the impact receiving member at the free end of said flexure, and wherein the brackets mount said flexure to said frame and said brackets extend along each broadside of said flexure to a point intermediate the frame and the impact receiving member whereby the flexure member slideably moves between said brackets dissipating the impact force imparted to the impact receiving member.

3. An improvement in a supporting frame-mounted clutch trip arm apparatus for controling the engagement and disengagement of a spring clutch or similar type mechanism, said improvement comprising:

a pair of parallel rigid plates mounted to said supporting frame, a flat rectangular cross-sectioned strip of resilient material mounted as a cantilever and contained over a portion of its length between said plates, the free end of said resilient strip extending beyond the ends of said plates, an elongated rigid member mounted on the broadside of said strip at a point beyond said plates, said member extending in the direction of the width of said strip, said parallel rigid plates defining a first effective length of said resilient strip extending from the mounting end of said strip to the longitudinal axis of said rigid member for absorbing and dissipating an impact load applied transverse to the cross-section of said rigid member and transmitted thereby to said resilient strip wherein said strip slideably deflects between said plates in response to said impact load, and said parallel plates defining a second effective length of said resilient strip over the unconfined portion of the length of the strip extending from the adjacent ends of said plates to the longitudinal axis of said rigid member for absorbing and dissipating a torsional load applied to said resilient strip through the rigid member.

4. A flexure mounting subjected to bending and torsional loads said mounting comprising:

a resilient strip capable of receiving a bending load having a component of force applied in a direction parallel to the broadsides thereof and capable of receiving a torsional load having a component of force applied orthogonal to the broadsides thereof, and a pair of parallel rigid plates cantileverly supporting said strip therebetween, said plates extending in slideable contact along each broadside of said strip to a point intermediate the ends of said strip, said plates defining a first effective length extending longitudinally along said strip from the cantilever support to the point of the application of the bending load and defining a second effective length extending longitudinally along said strip from ends of said plates intermediate the ends of said strip to the point of the application of the torsional load.

References Cited

UNITED STATES PATENTS

| | | | |
|---|---|---|---|
| 1,223,397 | 4/1917 | Kiewicz | 192—149 |
| 3,204,739 | 9/1965 | Moore | 192—149 X |
| 3,301,361 | 1/1967 | Campion | 192—22 |

MARTIN P. SCHWADRON, *Primary Examiner.*

C. LEEDOM, *Assistant Examiner.*